United States Patent
Rasanen et al.

(10) Patent No.: US 8,234,382 B2
(45) Date of Patent: Jul. 31, 2012

(54) SERVICE AND CAPABILITY NEGOTIATION IN A NETWORK USING SINGLE NUMBERING SCHEME

(75) Inventors: Juha Rasanen, Espoo (FI); Mikko Ohvo, Numminen (FI); Jorma Peisalo, Vantaa (FI); Juha Erjanne, Tampere (FI)

(73) Assignee: Nokia Corporation, Espoo (FI)

( * ) Notice: Subject to any disclaimer, the term of this patent is extended or adjusted under 35 U.S.C. 154(b) by 929 days.

(21) Appl. No.: 10/491,243

(22) PCT Filed: Oct. 8, 2001

(86) PCT No.: PCT/EP01/11635
§ 371 (c)(1),
(2), (4) Date: Mar. 30, 2004

(87) PCT Pub. No.: WO03/032598
PCT Pub. Date: Apr. 17, 2003

(65) Prior Publication Data
US 2004/0252695 A1    Dec. 16, 2004

(51) Int. Cl.
*G06F 15/16* (2006.01)
(52) U.S. Cl. .......... 709/227; 709/228; 455/445
(58) Field of Classification Search .......... 709/200, 709/201–207, 217–232, 249; 455/435.1, 455/435.2, 436, 437, 442, 452.1, 445
See application file for complete search history.

(56) References Cited

U.S. PATENT DOCUMENTS

| | | | |
|---|---|---|---|
| 5,572,584 A * | 11/1996 | Yabusaki et al. | 379/229 |
| 5,638,412 A | 6/1997 | Blakeney, II et al. | |
| 6,026,077 A * | 2/2000 | Iwata | 370/254 |
| 6,233,619 B1 * | 5/2001 | Narisi et al. | 709/230 |
| 6,240,079 B1 | 5/2001 | Hämäläinen et al. | |
| 6,408,173 B1 * | 6/2002 | Bertrand et al. | 455/406 |
| 6,581,092 B1 * | 6/2003 | Motoyama et al. | 709/219 |
| 6,697,474 B1 * | 2/2004 | Hanson et al. | 379/201.01 |
| 6,735,614 B1 * | 5/2004 | Payne et al. | 709/203 |
| 6,788,653 B1 | 9/2004 | Sakamoto et al. | |
| 6,789,120 B1 * | 9/2004 | Lee et al. | 709/227 |
| 6,883,023 B1 * | 4/2005 | Wang et al. | 709/220 |
| 6,910,081 B1 * | 6/2005 | Hammond | 709/245 |
| 6,947,374 B2 * | 9/2005 | Sasaki et al. | 370/218 |
| 6,947,396 B1 * | 9/2005 | Salmi | 370/310 |

(Continued)

FOREIGN PATENT DOCUMENTS

EP    0 825 791 A1    2/1998

(Continued)

OTHER PUBLICATIONS

Tdoc S2-031973, "*TR 23.851 version 0.2.0*", 3GPP TSG-SA WG2 meeting #32, May 7, 2003, 1 page.

(Continued)

*Primary Examiner* — David Lazaro
*Assistant Examiner* — Marie Georges Henry
(74) *Attorney, Agent, or Firm* — Harrington & Smith

(57) ABSTRACT

The invention proposes a method of controlling a network to which a communication device is connected, comprising the steps of obtaining (S13) connection capability information from the network and evaluating (S14) a connection service based on to the obtained connection capability information. The invention also proposes a correspondingly adapted communication device. Thus, network capabilities related failures may be eliminated since the communication device is aware of the relevant connection capabilities in the network etc.

5 Claims, 2 Drawing Sheets

U.S. PATENT DOCUMENTS

| | | | | |
|---|---|---|---|---|
| 7,088,720 | B1 * | 8/2006 | Schneider et al. | 370/395.1 |
| 7,353,279 | B2 * | 4/2008 | Durvasula et al. | 709/227 |
| 7,478,161 | B2 * | 1/2009 | Bernet et al. | 709/228 |
| 7,974,630 | B1 * | 7/2011 | Haumont et al. | 455/450 |
| 2002/0184385 | A1 * | 12/2002 | Kato | 709/237 |
| 2003/0028647 | A1 * | 2/2003 | Grosu | 709/227 |
| 2011/0158174 | A1 * | 6/2011 | Hurtta et al. | 370/328 |

FOREIGN PATENT DOCUMENTS

| | | |
|---|---|---|
| JP | A-H08-167985 | 6/1996 |
| JP | A-H08-251284 | 9/1996 |
| JP | 11512889 | 11/1999 |
| JP | 11513215 | 11/1999 |
| JP | A-2000-215598 | 8/2000 |
| JP | A-2001-244905 | 9/2001 |
| JP | 2008251284 (A) | 10/2008 |
| WO | WO 97/44975 | 11/1997 |
| WO | WO 00/65851 | 11/2000 |
| WO | WO 01/90891 A1 | 11/2001 |
| WO | WO 01/91382 A1 | 11/2001 |
| WO | WO 03/045095 A1 | 5/2003 |

OTHER PUBLICATIONS

3GPP TR 23.851 V0.2.0, "*3$^{RD}$ Generation Partnership Project; Technical Specification Group Services and System Aspects; Network Sharing; Architecture and Functional Description (Release 6)*" May 2003, pp. 1-14.

3GPP TR 23.851 V0.2.0, "*3$^{RD}$ Generation Partnership Project; Technical Specification Group Services and System Aspects; Network Sharing; Architecture and Functional Description (Release 6)*" May 2003, pp. 1-14 (with changes indicated).

Tdoc S2-031997, 3GPP TSG-SA WG2 meeting #32, "*Introduction of Shared Network Domain*", May 7, 2003, pp. 1-3.

Tdoc S2-032132, 3GPP TSG-SA WG2 meeting #32, "*Introduction of Shared Network Domain*", May 7, 2003, pp. 1-3.

3GPP TS 31.102 v4.5.0, "*3$^{RD}$ Generation Partnership Project; Technical Specification Group Terminals; Characteristics of the USIM Application (Release 4)*", Jun. 2002, pp. 141.

3GPP TR 23.851 v0.3.0, "*3$^{RD}$ Generation Partnership Project; Technical Specification Group Services and System Aspects; Network Sharing; Architecture and Functional Description (Release 6)*" May 2003, pp. 1-17.

Minutes of the S2 #32 Meeting Draft 03, May 12-16, 2003, San Diego, CA U.S.A.

3GPP TS 27.001 V4.1.0 (Sep. 2000) 3$^{rd}$ Generation Partnership Project; Technical Specification Group Core Network; General on Terminal Adaptation Functions (TAF) for Mobile Stations (MS); pp. 1-75; (Release 4).

3GPP TS 29.007 V3.8.0 (Mar. 2001) 3$^{rd}$ Generation Partnership Project; Technical Specification Group Core Network; General requirements on interworking between the Public Land Mobile Network (PLMN) and the Integrated Services Digital Network (ISDN) or Public Switched Telephone Network (PSTN); (Release 1999).

3GPP TsS 24.008 V3.8.0 (Jun. 2001) 3$^{rd}$ Generation Partnership Project; Technical Specification Group Core Network; Mobile radio interface layer 3 specification; Core Network Protocol—Stage 3 (Release 1999); pp. 1-442.

\* cited by examiner

SERVICE AND CAPABILITY NEGOTIATION IN A NETWORK USING SINGLE NUMBERING SCHEME

FIELD OF THE INVENTION

The present invention relates a method of controlling a network to which a communication device is connected, and to a correspondingly adapted communication device.

BACKGROUND OF THE INVENTION

Mobile stations require a lot of information about the capabilities of the used network and the called or calling party. Usually this information is available at the call setup signalling. However, this is not always the case. When information is missing, service and bearer level compatibility may not be reached at the call setup and the call fails. This problem is described in the following in more detail.

Mobile networks can support either a multinumbering scheme or a single numbering scheme (SNS) or both (ref. to 3GPP TS 29.007). Commercial networks started with multinumbering scheme in the beginning of the GSM era, but several operators have later introduced the single numbering scheme despite the below mentioned (and solved) problem with the scheme.

In the multinumbering scheme the user has a separate MSISDN number for each service that is used in a mobile terminated call. Service information is stored per each MSISDN number in the home location register (HLR) or home subscriber server (HSS). The information is used in a mobile terminated call setup when no unambiguous service information is received from the calling party in the incoming setup request. Ref. to 3GPP TS 29.007.

In the single numbering scheme the user has only one MSISDN number common to all services. When no unambiguous service information is received from the calling party in the incoming setup request, the network sends the setup without a service definition to the mobile station (MS). The MS shall determine the service to be used in the call. There is a risk that the mobile network or the intermediate network(s) or the calling party cannot support the service or the channel configuration indicated by the MS (ref. to 3GPP TS 27.001, version 4.1.0).

Thus, when the MS responds with a service definition (e.g. a multislot/HSCSD channel configuration) that cannot be supported by the network, the call will fail. Consequently, to be on the safe side, the basic 9.6 kbit/s service should always be used to guarantee a successful call. However, 9.6 kbit/s is too slow for many applications.

Alternatively, the MS may respond with the same data rate. However, the MS does not know whether the ITC (Information Transfer Capability) in the original call setup is UDI/RDI or 3.1 kHz or speech. Consequently, even if the data rate itself is correct, the call may fail because the other party may use e.g. a modem and the other e.g. a UDI/RDI protocol.

Thus, summarising, the invention relates to the problem of ambiguous service information receiving setup request. In such cases, the network sends the setup without a service definition to the mobile station (MS). The MS shall determine the service to be used in the call. However, there is a risk that the mobile network or the intermediate network(s) or the calling party cannot support the service or the channel configuration indicated by the MS.

In the above, problems related to mobile terminated call were described. However, similar problems also occur for the mobile originated case, as is described in the following.

For example, when a user is roaming in a visited network, the user does not know the capabilities of the visited network and is thus unable to configure the MS to make a successful data call to a home intranet. (A well educated user would make a few trials with different settings, but even this nuisance can be avoided with the method proposed in this report). Hence, in this case the user can either try to use the service he wishes to use and to hope that this service is supported, or he can set up a basic service call with a data rate of, e.g., 9.6 kBit/s.

Both approaches are disadvantageous, since in the first alternative, the call may fail, and in the second alternative, the full performance of the MS cannot be utilised. Hence, the present situation is not acceptable.

SUMMARY OF THE INVENTION

Thus, the object underlying the invention resides in providing a mechanism by which a service supported by the network can easily be provided.

This object is solved by a method of controlling a network to which a communication device is connected, comprising the steps of obtaining connection capability information from the network and evaluating a connection service based on to the obtained connection capability information.

Moreover, the above object is also solved by a communication device adapted to be connected to a network, wherein the communication device is adapted to obtain connection capability information from the network, and to evaluate a connection service based on to the obtained connection capability information.

Thus, according to the invention, the communication device obtains relevant connection capabilities and is able to correspondingly evaluate a connection service. That is, the connection service is evaluated with respect to the services available in the network, such that the requested connection service is accordingly modified or adapted. Hence, the communication device will only establish connection services which are supported by the network.

Thus, network capabilities related failures are eliminated since the communication device is aware of the relevant connection capabilities in the network etc. Hence, also ITC (information transfer capability) related failures are eliminated.

The connection capability information may comprise network capability information and/or information about capability of the far end party. Furthermore, the connection capability information may comprise information about capability of intermediate networks between the network, to which the communication device is connected, and a far end party.

The connection capability information may be obtained upon originating a call. Alternatively, the connection capability information may be obtained upon terminating a call. Also, the connection capability information may be obtained upon registering to the network, and the obtained information are stored in the communication device. In addition, the connection capability information may be obtained during a configuration procedure wherein a user or operator is invited to manually configure the communication device with the connection capability information.

Moreover, the connection capability may be obtained from the network through a messaging service, and the obtained information may be stored in the communication device. The messaging service may be SMS (Short messaging service) or USSD (Unstructured supplementary data).

Moreover, a connection service requested by a user of the communication device may be obtained, such that in the evaluating step it is checked whether the connection service is supported by the network, and, if necessary, the requested service is modified according to the obtained connection capability information. That is, the communication device may override the connection service requested by the user in case it has detected that the network does not support this service.

For obtaining the connection capability information, a setup message including the connection information from the network may be received by the communication device. That is, the network actively informs the communication device in a setup message about its capabilities.

In the evaluating step, a connection service may be determined according to the obtained connection capability information, and information about a determined connection service may be generated. The information about the determined connection service may be transmitted to a far end party in a message. By this information, the far end party and other relevant network control elements may be informed about the supported connection service.

The communication device may be a mobile communication device and the network may be a mobile communication network. Namely, the invention is applicable to mobile networks most advantageously, since in particular in case of a mobile station roaming in a visited network the mobile station is not aware about the capabilities of the visited network.

However, the communication device may also be a fixed communication device and the network may be a fixed communication network. The invention has also advantages in this case, since here a fixed communication device can easily be connected to another fixed network (e.g., after a removal in a foreign country) without the necessity to newly configure the communication device.

Furthermore, the invention proposes a method of controlling a network and a connection between a communication device and a far end party, the method comprising the steps of
- detecting information about a supported connection service generated by the communication device,
- detecting connection related information between the network control element and a far end party, and
- evaluating whether the detected information and the connection related information match to each other.

Alternatively, the invention also proposes a network control element which is adapted to control a network and a connection between a communication device and a far end party,
- wherein the network control element is further adapted to detect information about a supported connection service generated by the communication device, to detect connection related information between the network control element and a far end party, and to evaluate whether the detected information and the connection related information match to each other.

By this measure, it can be secured whether a communication device connected to the network control element supports the feature of the invention, namely, negotiation of the connection service. In case wrong information are supplied, it can easily be determined that the communication device does not support the feature, or that defect information were generated.

The information about the supported connection service generated by the communication device may be overriden in case the information do not match. That is, when the communication device does not support the feature of the invention or has produced defect information, this information is cancelled and call establishment as according to the prior art is performed. By this measure, the method according to the invention is backwards compatible, since also communication devices are supported which do not generate the information about the supported connection service.

The network control element may be an interworking function (IWF), which may be arranged inside the visited network or between the home network of the communication device and a visited network.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention are described in more detail with reference to the accompanying drawings.

Figure 1:
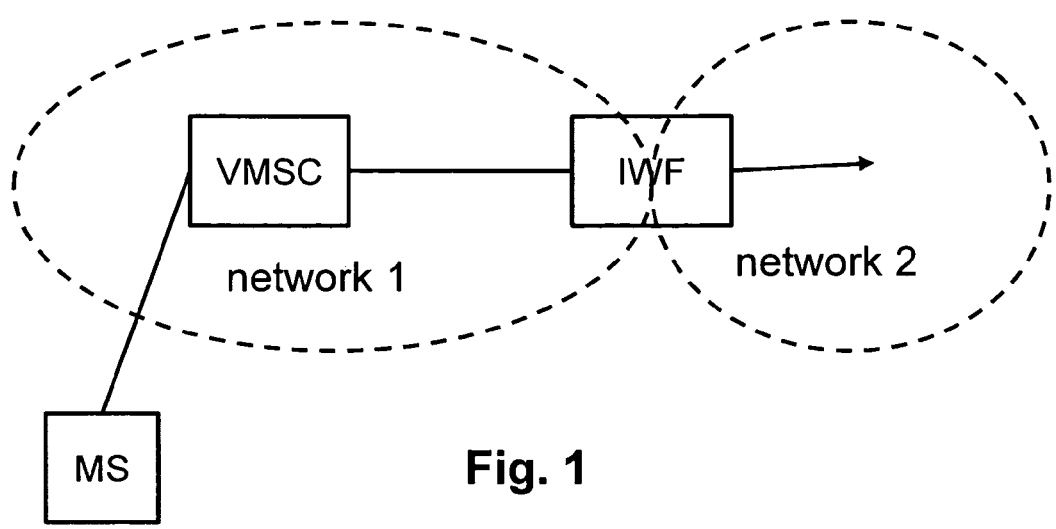
FIG. 1 shows a structure of a network system in which the embodiments of the invention are applicable, FIG. 2 a flowchart of a call setup procedure according to a first embodiment, FIG. 3 a signalling flow of a call setup procedure according to a second embodiment, and FIG. 4a flowchart of a failure procedure according to a third embodiment.

FIG. 1 shows an outline of network system to which the present invention is applicable. It is assumed that a mobile station (MS) is roaming in a visited network 1. The visited network is controlled by a mobile services switching centre (MSC), which is from the viewpoint of the MS a visited MSC (VMSC). Another network 2 (which may be, but does not necessarily have to be the home network of the MS) is connected via an interworking function (IWF) to the network 1. It is noted that instead of an MSC, also an MSS (MSC server), may be used, which is in this case a visited MSS (VMSS). The IWF may be integrated in the VMSC.

According to the embodiments described in the following, the MS either collects actively information about capabilities of the visited network to which it is connected etc. (and, if necessary, also about the home network and/or the far end party), or is supplied with such information.

In the following, the information obtaining procedure is described for the case in which the MS actively collects the information as a first embodiment. That is, according to the first embodiment, the mobile station collects information about the capabilities of the networks it is roaming and is used in, and about the far-end party. The information is stored in the MS (in the mobile terminal (MT) itself or in the subscriber identity module (SIM)) for later use. Alternatively, the network capabilities related information can be configured in the MS for example manually by the user or automatically by the operator or the network.

Next, some examples are described as to how the MS may get the information regarding the capabilities of the networks and so on.

When a user makes or receives calls with the MS, the MS collects information of the capabilities of the networks and the call parties (e.g. servers at certain addresses) by observing which services and bearers are available in the network and by monitoring details of call setup parameters. The MS stores the information (e.g. in the mobile terminal itself or SIM (Subscriber Identity Module)) per visited network (based e.g. on the Mobile Country Code and Mobile Network Code) and/or per call party (based on the identification, e.g. MSISDN number or IP address, of the call party).

That is, the MS actively collects the required information from the networks in question.

Alternatively, the capability and information of networks and call parties (e.g. servers) can be configured in the MS for example by the user or the operator.

In this case, the necessary information may be available through other ways (e.g., operator home pages in the Internet, handbooks or the like), such that the user (or even the operator) can configure the MS accordingly.

Alternatively, the network may feed the capability information to the MS, for example through SMS or other available transport means (e.g., USSD or e-mail), for example upon registering to the network, for being automatically configured/stored by the MS itself.

That is, in this case the MS gets the necessary information by some transport means and automatically configures itself according to the information.

In the following, the information regarding the capability of the network etc. are described in more detail.

The information collected by the MS may comprise for example:
1) CS bearer supported by the mobile network. For example in GSM:
   HSCSD/multislot configuration
   TCH/F14.4 channel coding
   Data compression
   ECSD channel codings (TCH/F28.8, TCH/F32, TCH/F43.2)
2) Connection elements supported by the mobile network:
   Transparent
   Non-transparent
3) Information transfer capability supported by the network or the call party:
   UDI/RDI
   3.1 kHz
   Speech.
4) Protocol support, for example:
   ITU-T V. 120 protocol
   ITU-T V. 110 protocol
   Frame Tunneling Mode (FTM)
5) Asynchronous/synchronous capability supported by the network
   Asynchronous
   Synchronous
6) Multimedia The above list is of course not exhaustive, and other, additional information items can be added.

In the following, the abbreviations used above are shortly explained: HSCSD (High speed circuit switched data), RDI (Restricted digital information), TCH (Traffic channel), TCH/F (Full rate traffic channel), UDI (Unrestricted digital information).

The MS can use the stored information for example when it receives a call in a single numbering environment, and the intermediate network(s) cannot transmit unambiguous service information from the calling party to the MS.

In this case, the MS shall, according to current 3GPP specifications (ref. to TS 29.007 and 27.001), determine which service to be used, and send a service definition in a BCIE (Bearer capability information element) to the network. According to the situation in the prior art, the MS can only guess, which service to use, ref. to 3GPP TS 27.001 version 4.1.0. The requested bearer may not be supported by the visited network, which means that the call fails. Or, to be on the safe side, the MS may request a basic 9.6 kBit/s bearer even though the network would be able to support a HSCSD bearer, which means that the user gets only a low speed service even though operating in a high speed environment.

According to the present embodiment, however, the MS has gathered information of the capabilities of the networks and the call parties. Thus, the MS can respond with a service and bearer requirement that matches the available capabilities of the operating environment. For example, if the MS is normally configured to be used in a network supporting HSCSD, the user would not need to tamper with settings trying to find out supported configuration, but the MS would automatically lower requested service level to match the capabilities of the roamed network (that does not necessarily support HSCSD). In practice, fallback from HSCSD to non-HSCSD call does not currently work in networks which do not support HSCSD, but the call is released if HSCSD call is requested (ref. to 3GPP TS 27.001, version 4.1.0).

Figure 2:
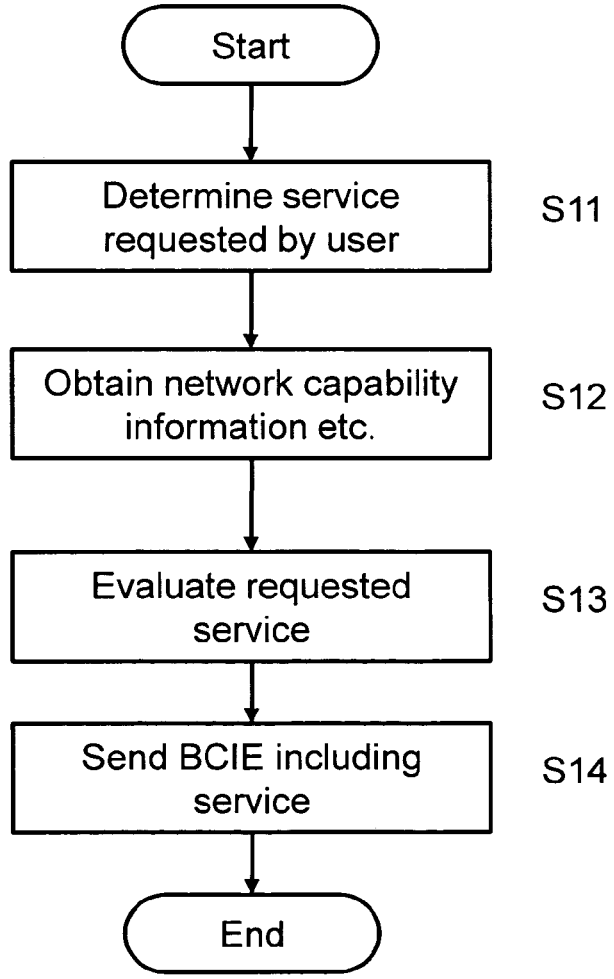

The above procedure is illustrated in the flowchart of FIG. 2. The procedure is started when a call is originated.

In step S11, the service which is requested by the user is obtained. For example, this may be HSCSD, when this is normally supported by the MS, as described above.

In step S12, the network capability information and the like are obtained. It is noted that during performing this step, the MS may either actively request the network to send the necessary information to the MS or by accessing a memory in the MS in which this information is stored beforehand.

Thereafter, in step S13 the requested service is evaluated with respect to the obtained network and/or far end side capability information. That is, it is checked whether the requested service is supported by the network, an intermediate network and/or the calling party. If necessary, the service is modified accordingly. For example, in a case high-rate speech connection is not supported, the connection is changed to a corresponding low-rate speech connection. Otherwise, (e.g., in the above example regarding HSCSD) the MS may indicate to the user that the requested service is not supported and suggest selecting another service. In a positive case, i.e., when the requested service is supported by the network, the service is not modified at all in this step. The information about the supported service is written into a BCIE (bearer capability information element) in step S14.

Thereafter, the procedure is ended and the normal communication proceeds.

In the following, some examples for the above negotiation of requested services are described.

EXAMPLE 1

The MS supports multimedia. The MS has previously made calls in the network it is currently roaming, and found out that the network supports CS multimedia (synchronous bearers, multimedia signalling), TCH/F14.4 channel coding and Multislot configuration. (Alternatively, the network capabilities per network may have been preconfigured in the MS (MT (mobile terminal) or SIM (subscriber identity module)).

The MS receives a call setup without a service indication. The MS responds with a BCIE requesting 28.8 kbit/s multimedia call with a modem (i.e. ITC=3.1 kHz) and with a 2*TCH/F14.4 channel configuration.

If the called party was really requesting a multimedia call, the call is set up as a multimedia call. If the called party was requesting a speech call, the call will fall back to speech (ref. to 3GPP TS 29.007, 24.008 and 27.001).

EXAMPLE 2

The MS has just made a call to an intranet access server that will call back after an identification check. The MS has found out, either during the just made call to the access server or during some previous call in the network, that the network supports TCH/F14.4, Multislot, Non-transparent connection, UDI and V.120 protocol. (Alternatively, the network capabilities per network may have been preconfigured in the MS (MT or SIM)).

The setup message of the call back by the server does not contain a service definition. The MS responds with a BCIE requesting a non-transparent, 28.8 kbit/s, UDI/V.120 multislot call with a 2*TCH/F14.4 channel configuration.

EXAMPLE 3

The MS has previously received calls in the network it is currently roaming in, and found out that the network supports TCH/F14.4, Multislot, Non-transparent connection, ITC=3.1 kHz (modem), but does not support UDI. (Alternatively, the network capabilities per network may have been preconfigured in the MS (MT or SIM)).

The user makes a call to the home network, the default settings being Non-transparent, 56 kbit/s, UDI/V.120, multislot with a 3*TCH/F14.4 channel configuration.

The MS turns the setup automatically to Non-transparent, 3.1 kHz autobauding (modem), with a 2* TCH/F14.4 channel configuration to match the capabilities of the visited network.

EXAMPLE 4

The MS has previously made calls to a certain server (one of the access servers the user more or less regularly uses) and found out that the server supports ITC=3.1 kHz (i.e. modem) but does not support UDI. (Alternatively, the server capabilities per identification/address may have been preconfigured in the MS (MT or SIM)).

The user makes a call to the server, the default settings being e.g. Non-transparent, 56 kbit/s, UDI/V.120, multislot with a 3*TCH/F14.4 channel configuration.

The MS turns the setup automatically to Non-transparent, 3.1 kHz autobauding (modem), with a 2* TCH/F14.4 channel configuration to match the capabilities of the server.

In the following, a more detailed example for implementing the present embodiments is described.

Currently, the MS has information about the real names of the networks. A network is identified by its Mobile Country Code (MCC) and Mobile Network Code (MNC). E.g. MCC 244 and MNC 5 identify the network as Finnish Radiolinja operator's network. This information can be extended to contain the (gathered) information about network capability.

Now, in case of mobile originated (MO) calls, the MS accesses this information and compares the network capabilities information and the user requested service. MS modifies the requested service, if needed, to comply with the network capabilities.

If the network capability information is not available, then the call is made according to user request and the outcome of the call is stored for further use.

Preferably, there is a possibility/mechanism to clear gathered information (per network or all at once) so that if the network is updated so that new services are available, the MS would not decline to use requested service because it has not been supported. Or, alternatively, it is preferably possible to turn the feature off. If the feature is turned off, information gathering can be turned on/off separately. It is also useful if the user could ask from the MS about the capabilities of the networks, i.e. read the gathered information.

In case of mobile terminated (MT) calls information about how to receive MT SNS (single numbering scheme) calls, i.e. fax, video, data, is needed from the user. When MT call without BCIE parameters in the SETUP message is received the MS would look up the rest of the parameters from the gathered information.

Thus, according to the first embodiment, the service capability of the network and called parties is collected by the MS either during connected calls or by receiving this information in a network-initiated feed. The information can also be configured in the MS by the user or the operator. The information is stored in the MS and can be used when initiating or receiving calls without network capability information available upon a call setup.

In the following, a second embodiment is described in which the information are sent to the MS on establishing a mobile terminated call. In the following, basically only the differences to the first embodiment are described. In particular, it is noted that the same connection capability information (network capability information, information about the far end party and the like) are the same.

According to the second embodiment, the mobile network indicate its relevant capabilities and available parts of the properties of the intermediate network(s) and the calling party to the MS through setup signalling. For example, if the MS supports multimedia and receives a call setup that indicates "ITC=UDI, TCH/F32 supported, multislot", the MS responds with a complete 64 kbit/s ITC=UDI multimedia BCIE.

This is described in the following in more detail.

Again, it is assumed that the MS is served by a MSC (Mobile services switching centre) or MSS (MSC server), which are, from the viewpoint of the MS, a visited MSC or MSS (abbreviated as VMSC or VMSS).

Figure 3:
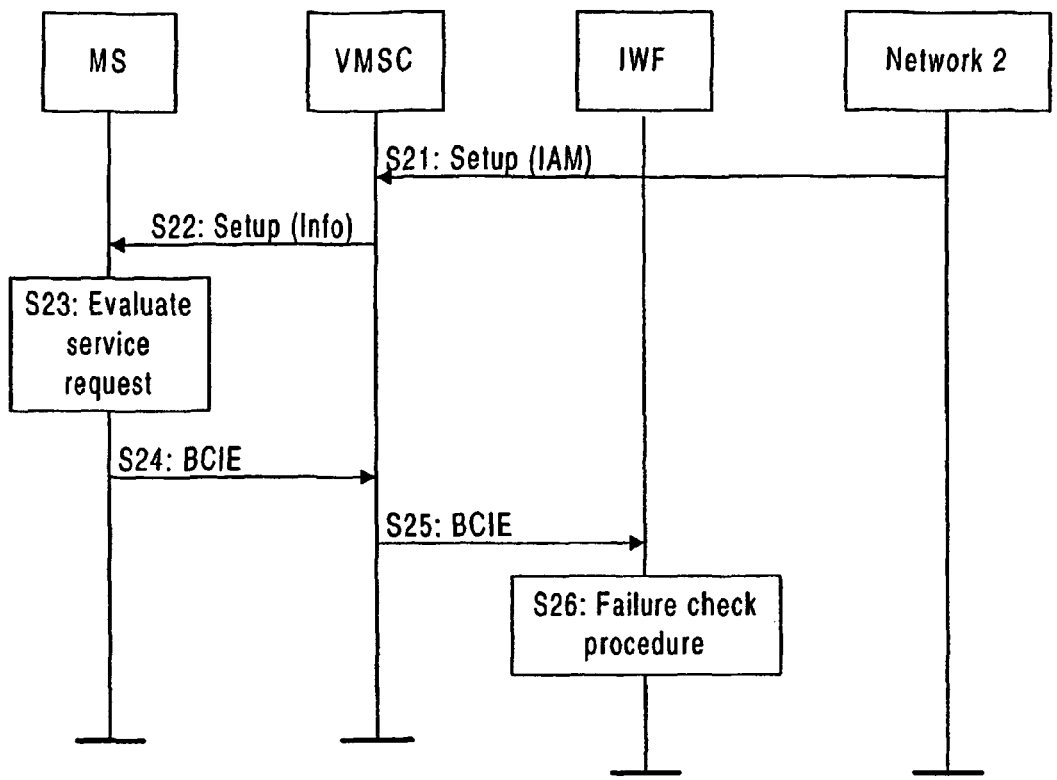

The procedure carried out is illustrated in the signalling flow diagram shown in FIG. 3.

The procedure is carried out when the VMSC or VMSS receives a setup message (e.g. IAM (Initial address message)) from the core/external network without a sufficient service definition (step S21), and the single numbering scheme (SNS) is used.

In step S22, the VMSC sends the data call related capabilities of itself and the relevant radio network (if known by the VMSC) and the ITC/TRM received from the calling party to the MS. Preferably, the information is sent in an existing message (like the SETUP message). For example, the information may be included in an extension or spare field of an existing element (like the NETWORK CALL CONTROL CAPABILITIES) as described in, e.g., ref. to 3GPP TS 24.008 subclauses 9.3.23.1 and 10.5.4.29. By this measure, backwards compatibility with mobile stations not supporting the proposed new feature is guaranteed, since in case of, e.g., sending an extra message, the MS not supporting the feature according to the invention may be confused.

However, of course also the use of other signalling messages and elements (e.g. Classmark) is also possible when the feature described herein is made mandatory to all MS.

In step S23, the MS evaluates the received information. That is, the MS receiving the setup with the network capabilities and ITC/TRM information deduces from the network capabilities information e.g. whether a multislot configuration and a TCH/F14.4 or a TCH/F28.8 or a TCH/F43.2 or a TCH/F32 channel and can be used in the visited network, whether either transparent (T) or non-transparent (NT) services or both are supported, and whether the calling party is requesting a UDI/RDI (Unrestricted digital transmission/restricted digital transmission), a 3.1 kHz or a speech call.

In step S24, the MS responds with a BCIE (Bearer capability information element) deduced from the above information and the related configuration at the MS itself.

This element (i.e., the information regarding the negotiated services) is used by the VMSC and IWF to set up the call. Optionally, a failure check procedure may be performed (after forwarding the BCIE to the IWF in step S25) in step S26, as will be described later. Thereafter, the normal call establishing procedure can be continued without a failure.

In the following, some examples for the above evaluation of the network capability information and the like are given.

EXAMPLE 5

If the MS has just made a call to an intranet access server that calls back after an identification check, and the incoming call indicates "ITC=UDI, TCH/F14.4 supported, multislot supported", the MS will set up a non-transparent call with a maximum data rate configuration with TCH/F14.4 supported by itself (e.g. 2*14.4=28.8 kbit/s) and with a UDI protocol.

EXAMPLE 6

The MS supports multimedia. The MS receives a call setup that indicates "ITC=UDI, TCH/F32 supported, multislot". The MS responds with a complete 64 kbit/s ITC=UDI multimedia BCIE

EXAMPLE 7

The MS supports multimedia. The MS receives a call setup that indicates "ITC=3.1 kHz, TCH/F14.4 supported, multislot supported". The MS responds with a complete 28.8 kbit/s ITC=3.1 kHz multimedia BCIE. (If the calling party happened to request a speech service anyway, a standard fallback from 3.1 kHz to speech is made).

Next, as a third embodiment of the invention it is described which actions are performed in case the MS selects wrong services due to a failure or because the actual MS does not support the feature of the invention. That is, according to the third embodiment the failure check procedure mentioned above with reference to FIG. 3, step S26, is performed.

In particular, a network control element such as an interworking function (IWF) may use an automatic data rate detection and an automatic protocol detection on the leg between the IWF and the calling party to eliminate a failure in case the MS has indicated a wrong fixed network data rate (FNUR) or protocol (i.e. a FNUR or protocol differing from that used by the calling party). In the present embodiment it is assumed that the VMSC and the IWF are separate entities. In this case, it is necessary to forward the BCIE to the IWF in step S25. However, as already mentioned above, the IWF may be integrated in the VMSC. In this case, the IWF can directly access the BCIE, such that a transmittal via the network is not required.

Figure 4:
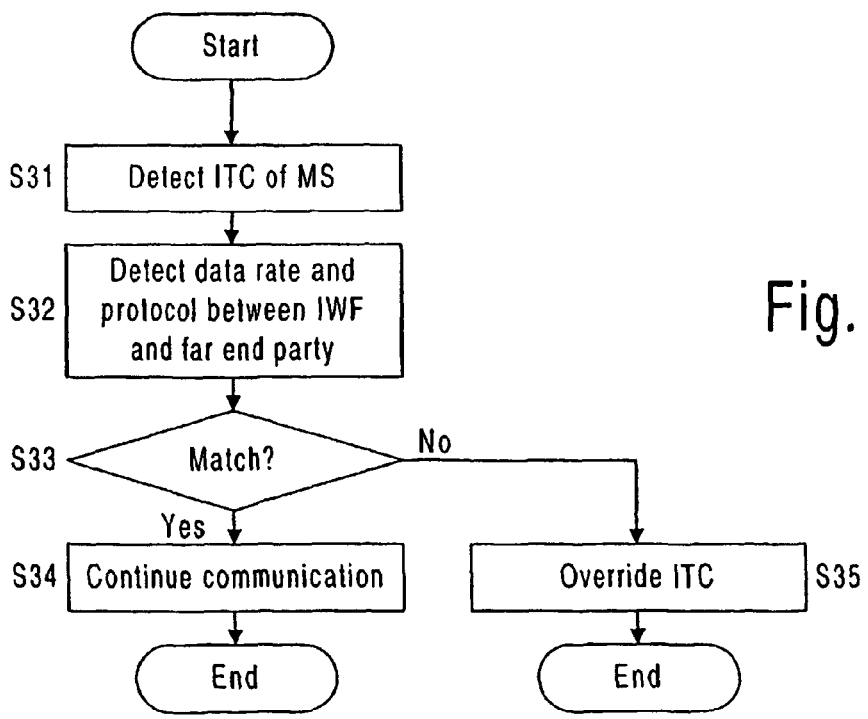

The procedure carried out in such a failure case is illustrated in the flowchart shown in FIG. 4.

In step S31, the IWF detects the ITC value of the called MS, that is, the ITC value that is set by the MS. In step S32, the IWF detects the data rate and protocol between the IWF and the calling party. In step S33, the IWF checks whether the detected ITC value of the MS in question matches with the detected data rate and protocol. If they match, the IWF determines that the MS is able to support the feature of the invention, and the normal communication is continued (step S34).

If, however, the above values do not match, the IWF determines that the called MS does not support the described service and network capability negotiation. Namely, the MS may respond with a wrong information transfer capability (ITC) value, i.e. with a value differing from the value indicated by the calling party.

In this case the interworking function (IWF) uses the ITC value received from the calling party, i.e. overrides the ITC received from the called mobile station (step S35). The IWF will then also adopt the related parameters to match the changed ITC value, e.g. if the ITC is changed from 3.1 kHz to UDI, no modem type is required.

It is noted that the procedure according to the third embodiment does not have to be carried out in an IWF, but can be performed in any kind of network control element.

Moreover, a case may occur that the MS suggests a service that does not match the service used by the calling party. In this case, the IWF would reject the call although the MS has correctly determined the service. However, with all the available information and the method described in the above embodiments, the probability for such a case is extremely low.

The above description and accompanying drawings only illustrate the present invention by way of example. Thus, the embodiments of the invention may vary within the scope of the attached claims.

For example, the above embodiments were described for the case in which a mobile station is roaming in a visited network. However, the invention is not limited on this case. Namely, by applying the negotiation procedure according to the invention, the network can easily be re-configured. For example, new services and the like can be introduced. A communication device adapted to perform the negotiation procedure can also easily utilise new services in the own home network without the need of being manually configured or the like.

Moreover, the above embodiments were described for an example in which a mobile communication network is employed. Although the invention is most advantageously applicable onto a mobile communication network, it can also be applied to a fixed communication network. For example, a fixed phone is transferred from one location to a new one, and at the new location it is connected to a new fixed network which has different properties than the old network. This may be the case when another operator runs the new network. In such a case, there is no need to configure the fixed phone manually to the network, when the invention is applied. For adopting the feature of the invention, it is necessary that corresponding messages comprising the required connection capability information (network capability and the like) are sent via the fixed network(s).

The invention claimed is:

1. A method, comprising:
    detecting first information about a supported connection capability able to be used for a communication between a called party and a calling party in a network, which first information is generated by network control element that controls connections between the called party and the calling party in the network;
    transmitting said first information from the network control element to the called party to be connected in the communication with the calling party;
    receiving second information from the called party about a connection service requested by the called party to be used for the communication between the called party and the calling party, which second information is determined by the called party based on the first information;

detecting, at the network control element, connection related third information about a supported connection service between the at least one network control element and the calling party;

evaluating, at the network control element, whether the requested connection service supports the supported connection service, and in response to the requested connection service not supporting the supported connection service between the network control element and the calling party:

overriding the second information about the requested connection service determined by the called party by using the connection related third information about the supported connection service to set up a communication using the supported connection service between the called party and the calling party.

2. An apparatus, comprising:
at least one memory comprising computer program code;
at least one processor;
the at least one memory and the computer program code configured, with the at least one processor, to cause the apparatus to perform at least the following:
detect first information about a supported connection capability able to be used at least by the apparatus for a communication between a called party and a calling party;
transmit the first information from the apparatus to the called party;
receive second information from the called party about a connection service requested by the called party to be used for the communication between the called party and the calling party, which second information is determined by the called party based on the first information,
detect connection related third information about a supported connection service between the apparatus and the calling party, and
evaluate whether the requested connection service supports the supported connection service, and wherein the processor is further configured, in response to the requested connection service not supporting the supported connection service between the apparatus and the calling party, to override the second information about the requested connection service determined by the called party by using the connection related third information about the supported connection service to set up a communication using the supported connection service between the called party and the calling party.

3. The apparatus according to claim 2, wherein the processor operates according to an interworking function.

4. An apparatus, comprising
means for controlling a network and a connection between a called party and a calling party in the network;
means for detecting first information about a supported connection capability able to be used for a communication between the called party and the calling party;
means for transmitting the first information to the called party to be connected in the communication with the calling party;
means for receiving second information from the called party about a connection service requested by the called party to be used for the communication between the called party and the calling party, which second information is generated by the called party based on the first information;
means for detecting connection related third information about a supported connection service between the apparatus and the calling party;
means for evaluating whether the requested connection service supports the supported connection service; and
means, responsive to the requested connection service not supporting the supported connection service between the apparatus and the calling party, for overriding the second information about the requested connection service determined by the called party by using the connection related third information about the supported connection service to set up a communication using the supported connection service between the called party and the calling party.

5. A computer program embodied on a non-transitory computer-readable medium, the computer program configured to control a processor to perform operations comprising:
detecting first information about a supported connection capability able to be used for a communication between a called party and a calling party in a network, which first information is generated by at least one network control element that controls connections between the called party and the calling party in the network;
transmitting said first information from the at least one network control element to the called party to be connected in the communication with the calling party;
receiving second information from the called party about a connection service requested by the called party to be used for the communication between the called party and the calling party, the second information determined by the called party based on the first information;
detecting, at the at least one network control element, connection related third information about a supported connection service between the at least one network control element and the calling party;
evaluating, at the at least one network control element, whether the requested connection service supports the supported connection service; and
in response to the requested connection service not supporting the supported connection service between the at least one network control element and the calling party:
overriding the information about the requested connection service determined by the called party by using the connection related third information about the supported connection service to set up a communication using the supported connection service between the called party and the calling party.

* * * * *